219-121 SR
11/25/80 OR 4,236,059

United States Patent [19] [11] 4,236,059
McComas et al. [45] Nov. 25, 1980

[54] THERMAL SPRAY APPARATUS

[75] Inventors: Charles C. McComas, Stuart; Larry S. Sokol, West Palm Beach; Earl M. Hanna, Greenacres, all of Fla.

[73] Assignee: United Technologies Corporation, Hartford, Conn.

[21] Appl. No.: 974,666

[22] Filed: Nov. 3, 1978

Related U.S. Application Data

[63] Continuation of Ser. No. 834,087, Sep. 19, 1977, abandoned, which is a continuation of Ser. No. 512,585, Oct. 7, 1974, abandoned.

[51] Int. Cl.[2] .......... B23K 9/00
[52] U.S. Cl. .......... 219/121 P; 219/76.16; 427/34
[58] Field of Search .......... 219/121 P, 76.16; 427/34

[56] References Cited

U.S. PATENT DOCUMENTS

| | | | |
|---|---|---|---|
| 3,140,421 | 7/1964 | Spongberg | 219/121 P |
| 3,145,287 | 8/1964 | Sieben et al. | 219/121 P |
| 3,851,140 | 11/1974 | Coucher | 219/121 P |
| 3,914,573 | 10/1975 | Muehlberger | 219/121 P |
| 4,146,654 | 3/1979 | Guyonnet | 219/121 P |

*Primary Examiner*—Roy N. Envall, Jr.
*Assistant Examiner*—Clifford C. Shaw
*Attorney, Agent, or Firm*—Robert C. Walker

[57] ABSTRACT

Thermal spray apparatus capable of directing plasticized powders against a substrate for deposition of a protective coating thereon is disclosed. Various structural details of the apparatus of the present invention enable the attainment of high particle velocities without melting the particles. The apparatus is built around the concept of reducing the temperature of a hot plasma stream after the hot plasma stream is generated. Particles are injectedinto the hot plasma stream only after the medium is cooled. In detailed embodiments, a generated plasma is cooled by the addition of a diluent gas or by passing the generated plasma through an elongated heat exchanger upstream of the point at which the powders are to be injected.

11 Claims, 1 Drawing Figure

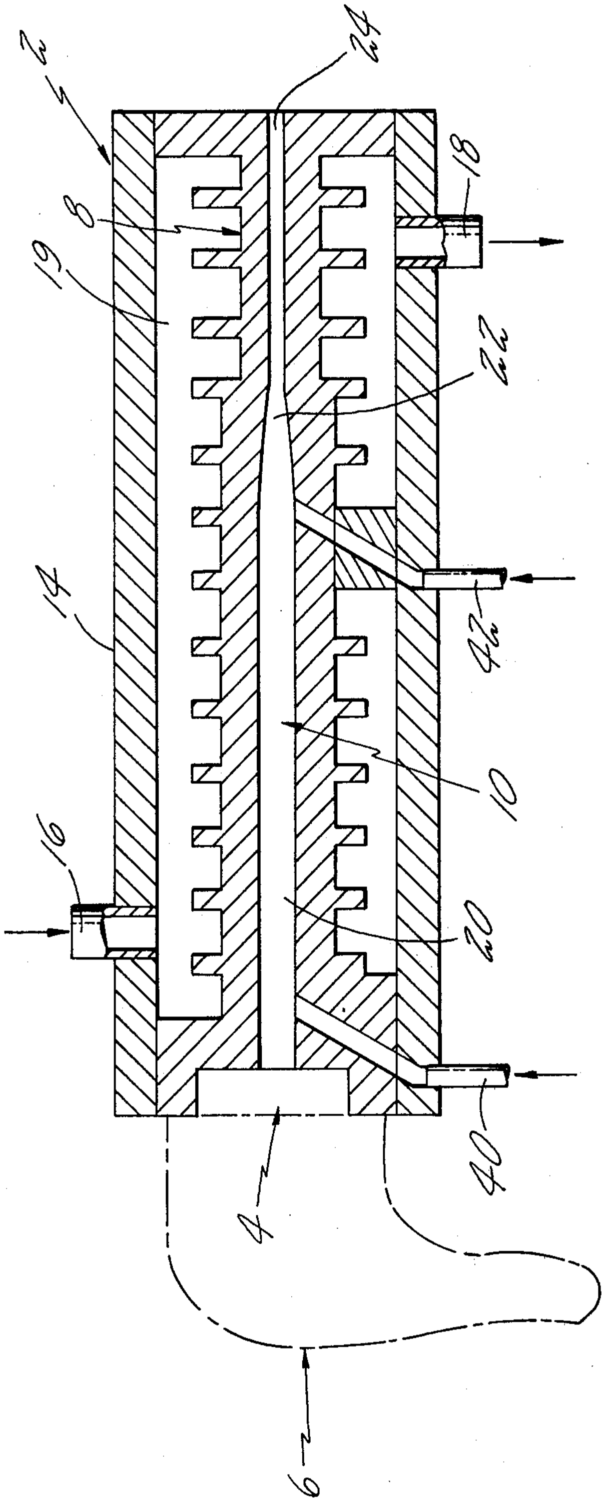
2
24
8
18
19
22
14
42
10
16
20
4
40
6

THERMAL SPRAY APPARATUS

This is a continuation of application Ser. No. 834,087, filed Sept. 19, 1977 which is a continuation of application Ser. No. 512,585, filed Oct. 7, 1974, both abandoned.

BACKGROUND OF THE INVENTION

The present invention relates in general to the coating arts and more particularly, to the production of coatings by thermal spray techniques.

Plasma spraying devices and techniques are well known in the art for depositing protective coatings on underlying substrates. One known device is illustrated in U.S. Pat. No. 3,145,287 to Siebein et al entitled "Plasma Flame Generator and Spray Gun". In accordance with the teaching of the Siebein et al patent, a plasma-forming gas forms a sheath around an electric arc, constricts and extends the arc part way down the nozzle. The gas is converted to a plasma state and leaves the arc and nozzle as a hot free plasma stream. Powders are injected into the hot free plasma stream and propelled onto the surface of the substrate to be coated.

A prior art device, such as that illustrated by Siebein et al, is employed in the apparatus of the present invention to generate a hot plasma stream and is identified as item 6 of the Drawing.

U.S. Pat. Nos. 3,851,140 to Coucher entitled "Plasma Spray Gun and Method for Applying Coatings on a Substrate" and 3,914,573 to Muehlberger entitled "Coating Heat Softened Particles by Projection in a Plasma Stream of Mach 1 to Mach 3 Velocity" disclose contemporaneous coating technology. Both contemporaneous patents are common with Siebein et al in that coating powders are introduced immediately downstream of the point at which the plasma is generated. Physically, the point of injection in each case is at the downstream end of the anode within which the plasma is generated.

In addition to the Siebein et al. and Muehlberger structures, Coucher employs a tubular nozzle downstream of the point of powder injection. According to the Coucher specification heat fusible material is thermally liquified as it contacts the hot plasma and is ejected with the hot plasma through the tubular nozzle.

Although the devices disclosed likely have utility in the coating industry, scientists and engineers continue to search for yet improved coating apparatus and techniques.

SUMMARY OF THE INVENTION

A primary aim of the present invention is to improve thermal spray coating apparatus and techniques. Spray apparatus having enhanced ability to accelerate coating particles within a plasma stream is sought, and a collateral objective is to enable acceleration of such particles in a plasticized state.

According to the present invention a plasma generator has affixed thereto, means for cooling the plasma dischargeable from the plasma generator and means for injecting coating powders into the cooled plasma downstream of the means for cooling the plasma.

In one embodiment of the invention, a cooled nozzle extension assembly adapted to mate with conventional plasma spray equipment is fabricated with an aerodynamically efficient passageway through which the hot plasma may be passed and into which the coating powders may be introduced at a selected location or locations along the passageway. In operation thereof, helium is utilized as the plasma gas.

In another embodiment of the invention, a nozzle extension assembly adapted to mate with conventional plasma spray equipment includes means for injecting a diluent gas into the hot plasma in the passageway to cool the plasma stream prior to the location at which coating powders are injected.

A major advantage of the invention results from an ability to generate optimum coating structures, in a variety of coating systems if desired, with excellent adherence and density. This advantage is, moreover, achieved with concurrent improvements in process economy and safety.

The foregoing, and other objects, features and advantages of the present invention will become more apparent in the light of the following detailed description of the preferred embodiment thereof as shown in the accompanying drawing.

BRIEF DESCRIPTION OF THE DRAWING

The drawing depicts plasma spray apparatus according to the teachings of this invention.

DESCRIPTION OF THE PREFERRED EMBODIMENTS

The plasma spray apparatus shown in the drawing corresponds to that which has been actually used in the deposition of coatings according to the present invention.

A spray nozzle extension assembly 2 is adapted to fit around the nozzle 4 of a standard plasma spray gun 6 of the type having a cylindrical electrode to which an electric arc is struck in the formation of a hot plasma stream and through which the hot plasma stream is flowable and of the type including means for cooling the cylindrical electrode, such as the METCO 3MB Plasma Gun with GP Nozzle. The nozzle extension assembly comprises a tubular finned member 8 having a passageway 10 extending therethrough. As shown, the finned member is formed of a material of high thermal conductivity, such as copper and is surrounded by a steel water jacket 14 having a cooling water inlet 16 and outlet 18. The cooling fluid passing through the water chamber 19 cools the finned member preventing melting or other heat damage due to the hot plasma flowing through the passageway 10 during operation of the apparatus. In its traverse through the passage way in the cooled finned member, the hot plasma itself undergoes substantial cooling.

In this apparatus in the interest of maintaining a high gas velocity the passageway 10 has been shaped for aerodynamic efficiency, utilizing an inlet portion 20, a nozzle portion 22 and an outlet portion 24. Generated plasma is cooled in the inlet portion 20 and is accelerated in the nozzle portion 22. Coating powders to be sprayed are introduced downstream of the inlet portion whereat the plasma has been cooled. The particular assembly shown is 6.3 inches in length with an inlet portion 4×0.215 inches, a nozzle portion about 0.25 inch long having a throat diameter of 0.14 inch, and an outlet portion having a diameter of 0.15 inch. Thus, the nozzle is convergent/slightly divergent.

Typically, it is desirable to provide the powders to the surface to be coated, not only at high velocity and heated, but in a plastic rather than molten condition. As the plasma gas traverses the passageway it is cooled and, accordingly, introduction of the powders at a downstream location will generally result in a reduced heating of the powders because the temperature is lower than the upstream temperature. Accordingly, the nozzle is fabricated to provide sufficient length to substantially reduce the plasma temperature in the nozzle. Thus, as the word "elongated" is used herein, it will be understood to mean sufficient length to provide substantial cooling of the plasma. From the foregoing, it will be seen that in the present invention the coating powders are exposed in a relatively low temperature/long time cycle as contrasted with a high temperature/short time cycle in conventional plasma spray operations.

The nozzle extension assembly is provided with an access port or ports, 40 and 42 in the drawing, through which powder may be introduced into the plasma gas stream. The location of these powder access ports will depend upon the powders being sprayed and the particular process parameters and apparatus being utilized. Basically, however, the location is selected to provide the correct heating of the powders.

In the spraying of nickel/aluminum in the apparatus described, the powders are admitted in an inert carrier gas through access port 42 which is a 1/16 inch hole located about 3.5 inches downstream from the nozzle extension inlet or just upstream of the nozzle portion.

One or more access ports can be utilized for the introduction of differing powder compositions where such powders are to be sprayed concurrently or sequentially, or for the introduction of powders of the same composition where the processing parameters are to be changed. The formation of graded coatings by gradually phasing in one composition while phasing out another thereby eliminating a planar interface between the compositions is readily achieved.

As has been previously discussed, powder temperature can be readily controlled in a given system by careful selection of the axial location along the passageway where the powders are admitted to the hot gas stream. The apparatus is also readily adaptable to other means of powder temperature control. Access port 40 or some other port can, for example, be utilized for the admission of a temperature-modifying, or diluent gas to the plasma stream. This temperature-modifying gas may simply be a cold gas stream of the plasma gas composition or may be one which alters the heat transfer characteristics or some other property of the plasma.

As shown, the nozzle extension assembly comprises apparatus distinct from the plasma gun itself. This particular construction was selected for reasons of practicality to permit utilization of the present invention with existing plasma equipment. There is, of course, no reason why the extended nozzle cannot be integral with the gun itself. Also although the finned member 8 is shown formed as a single piece, various portions thereof may preferably be formed as separate members either to permit adaption of the assembly to alternative coating operations or equipment, or simply to facilitate repairs or replacement of parts as they wear in use.

Usually to develop the optimum phase structure in the applied coating it is advantageous to have the powder particles impacting the surface to be coated in a plastic condition, but at as low a temperature as possible. However, the cooler the particles the higher the impact velocity must be to generate the maximum density and adherence. Thus, there is a considerable advantage to be gained through the provision of a capability of providing a high coating particle velocity.

Particle velocities are inherently limited by the gas velocity in the particular system being employed. In detonation spray processes, the particles are typically limited to shock wave velocities on the order of 2500 feet per second. Plasma spray guns, using argon as recommended by the manufacturers, may reach gas velocities up to 4000 feet per second. In the preferred embodiments of the present invention gas velocities of up to 12,000 feet per second or higher are possible.

Contrary to the usual industry practice, the use of helium as the plasma gas is preferred in the present invention. Although helium is known to have possible use in plasma spray operations, its light weight and poor heat transfer characteristics have resulted in industry discouraging its use in conventional plasma spray equipment. In the present invention its use is not only possible but advantageous.

In conventional equipment the gases exiting the plasma gun quickly disperse. Powders injected into such a stream reside therein for only a very short period of time. In these short residence times, the use of helium with its poor heat transfer capabilities, rather than argon, would increase the difficulty of imparting proper heat to the powders. This same short residence time and rapidly dispersing gas also aggravate the problem of providing the velocity component to the powders.

The preferred use of helium in the present invention provides controlled heating and a high velocity capability. In addition there are other advantages. With every coating process, it is essential to consider not only the effect of coating components and process parameters on the coating per se, but also their effect on the substrate being coated. Often the character of the substrate is such that certain temperatures of the substrate not be exceeded. The relatively poor heat transfer qualities of helium, as compared to argon for example, inherently result in a reduced heat transfer to the substrate.

In the conventional plasma spray operations, the dispersion of the heated gases results in a fairly large substrate area receiving heat, particularly areas where no coating is desired and which may be masked. In the present invention, there is a much greater degree of focus in the stream. Thus, smaller areas of the substrate are usually exposed at any one time to the hot gases and, hence, with a greater heat sink substrates remain cooler. As an additional benefit, it has been found that because of greater deposition area control the necessity and extent of masking is minimized; variations in coating structure and thickness are more controlled; and there is less powder waste, promoting economy.

Coating operations are also facilitated in another way through use of this invention. In use of a detonation gun operations are usually conducted with the operator positioned remote from the coating operation for safety reasons. With conventional plasma spray guns the exiting gas is at such a high temperature that eye damage from ultra-violet radiation can quickly occur and suitable eye protection is required. In the present invention, exit gas temperatures are reduced and the possibility of eye damage is lessened although, of course, suitable safety measures should be observed in any event.

In a conventional process, a part is typically prepared for coating by, first, masking to leave exposed only the areas to be coated; second, grit blasting; third, a cleanup to remove the effects of the grit blasting; and finally, a remasking. The present invention eliminates the need for many of these conventional steps in many cases. Since focusing is vastly improved the extent of masking is much reduced. Further, because particle velocities are very high, it has been found possible to eliminate the grit blasting operation and the masking and cleanup associated therewith. A simple surface wipe for degreasing with Freon has been found to be sufficient.

EXAMPLE

| | |
|---|---|
| Apparatus | |
| Plasma Gun | METCO 3MB with GP Nozzle |
| Power Supply | PLASMADYNE<br>350 D.C. arc amps<br>50-56 D.C. arc volts |
| Powder Feeder | S.S. AIRABRASIVE unit<br>(miniature grit blaster)<br>powder feed rate .357 lbs./hr. |
| Nozzle Extension Assembly | per drawing |
| Powder (METCO 450) | |
| Composition (wt. %) | 95 percent nickel<br>5 percent aluminum |
| Particle size | 170 + 325 mesh (ASTM B214) |
| Process Parameters | |
| Plasma Gas | helium |
| Gas Rate | 275 ft.$^3$/min. |
| Gun to Substrate Distance | 2-3 inches |
| Size of Focus | ⅜ inch |
| Substrate | titanium alloy |
| Coating area | flat washer |

DEPOSITION

Using the hand held coating gun with attached nozzle extension assembly, a coating 0.008-0.010 inch in thickness was applied for galling and fretting resistance to one surface of the flat washer.

Results

A coating density of well over 99 percent of theoretical density was achieved. This is in excess of that attainable in any conventional plasma process. Adherence was excellent. Repeated thermal shocking from high temperature resulted in no evidence whatsoever of cracking or flaking.

Although this invention has been described in detail with reference to certain examples and preferred embodiments for the sake of illustration, the invention in its broader aspects is not limited to such specific details but departures may be made from such details without departing from the principles of the invention and without sacrificing its chief advantages.

What is claimed is:

1. A nozzle extension piece for a plasma spray gun, which comprises:

a tubular finned member having a passageway extending therethrough for the passage of plasma generated in the spray gun;

a jacket structure encasing said tubular finned member;

means for flowing a cooling fluid between the jacket structure and the finned member in sufficient quantity to substantially reduce the temperature of the plasma flowing through the passageway of the finned member;

means for accelerating the plasma at a location whereat the temperature of the plasma has been substantially reduced; and means for injecting powder to be sprayed by the nozzle into said passageway at a location between the upstream end and the downstream end of the nozzle at an injection location providing sufficient powder residence time in the cooled plasma stream to impart a desired level of heating and a high velocity to the powder.

2. A plasma spray gun structure comprising means for forming a cooled plasma stream including a conventional plasma generator which is adapted to electrically excite an inert gas to form a high temperature plasma and a nozzle extension piece positioned downstream of the plasma generator which is adapted to substantially cool the plasma produced in the generator and to accelerate the substantially cooled plasma, and means for introducing powders to be sprayed into said cooled plasma stream at a location whereat the plasma has been cooled by said nozzle extension.

3. The apparatus according to claim 2 wherein said means for forming a cooled plasma stream includes means for injecting a temperature modifying gas into said plasma.

4. The apparatus according to claim 2 wherein said nozzle extension piece includes:

a tubular finned member having a passageway extending therethrough for the passage of plasma generated in the spray gun;

a jacket structure surrounding said tubular finned member; and means for flowing a cooling fluid between the jacket structure and the finned member in sufficient quantity to substantially reduce the temperature of the plasma flowing through the passageway of the finned member.

5. In a plasma spray gun of the type having means for forming a hot plasma stream including a cylindrical electrode to which an electric arc is struck in the formation of the hot plasma stream and through which the hot plasma stream is flowable, wherein said gun includes means for cooling said cylindrical electrode to prevent melting thereof during operation of the gun, the improvement comprising the addition thereto downstream of said hot plasma forming means of apparatus including:

means for substantially cooling the hot plasma stream to produce a cooled plasma stream;

means located downstream of said plasma cooling means for accelerating the cooled plasma stream; and means for introducing powders to be sprayed into the plasma at a location within the gun whereat the plasma has been cooled by said plasma cooling means.

6. The apparatus according to claim 5 wherein said means for forming a cooled plasma stream includes means for injecting a temperature modifying gas into said plasma.

7. The apparatus according to claim 5 wherein said means for forming a cooled plasma stream includes a nozzle having an elongated passageway through which the plasma is flowable, the nozzle being adapted to substantially reduce the temperature of the plasma flowing therein.

8. The invention according to claim 7 wherein said means for injecting powders into said cooled plasma stream is positioned upstream of the downstream end of the nozzle at a location providing sufficient powder residence time in the plasma stream to impart a desired level of heating and a high velocity to the powders.

9. The invention according to claim 5 wherein said means for substantially cooling the plasma is disposed between said cylindrical electrode of the plasma spray gun and said means for introducing powders to be sprayed.

10. A nozzle for a plasma spray device of the type for producing a plasma stream into which coating powders are injected, wherein the improvement comprises:

a spray nozzle including means for substantially cooling the plasma stream prior to the point at which powders are injected, and means for accelerating the substantially cooled plasma.

11. The invention according to claim 10 wherein said spray nozzle includes an inlet portion in which the plasma stream is cooled substantially and a throat portion at which said cooled plasma is accelerated.

* * * * *